United States Patent
Solem et al.

(10) Patent No.: US 10,089,762 B2
(45) Date of Patent: Oct. 2, 2018

(54) METHODS FOR NAVIGATING THROUGH A SET OF IMAGES

(71) Applicant: Mapillary AB, Malmö (SE)

(72) Inventors: Jan Erik Solem, Bjärred (SE); Yubin Kuang, Lund (SE); Johan Gyllenspetz, West Hollywood, CA (US); Peter Neubauer, Malmö (SE)

(73) Assignee: MAPILLARY AB (SE)

( * ) Notice: Subject to any disclaimer, the term of this patent is extended or adjusted under 35 U.S.C. 154(b) by 0 days.

(21) Appl. No.: 15/323,963

(22) PCT Filed: Jul. 1, 2015

(86) PCT No.: PCT/EP2015/065024
§ 371 (c)(1),
(2) Date: Jan. 4, 2017

(87) PCT Pub. No.: WO2016/001321
PCT Pub. Date: Jan. 7, 2016

(65) Prior Publication Data
US 2017/0200293 A1 Jul. 13, 2017

(30) Foreign Application Priority Data
Jul. 4, 2014 (SE) .................... 1450844

(51) Int. Cl.
*G06T 11/20* (2006.01)
*G06F 17/30* (2006.01)
(Continued)

(52) U.S. Cl.
CPC ........ *G06T 11/206* (2013.01); *G06F 17/3002* (2013.01); *G06F 17/30061* (2013.01);
(Continued)

(58) Field of Classification Search
CPC ......... G06F 17/30244; G06F 17/30247; G06F 17/3025; G06F 17/30256; G06F 17/30259; G06F 17/30265; G06F 17/30268
See application file for complete search history.

(56) References Cited

U.S. PATENT DOCUMENTS 5,802,361 A    9/1998  Wang et al.
5,995,106 A *  11/1999 Naughton ............... H04L 29/06
                                                       348/E5.102
(Continued)

FOREIGN PATENT DOCUMENTS

| | | |
|---|---|---|
| CN | 102509119 | 6/2012 |
| GB | 2469436 | 10/2010 |
| JP | 2007-156758 | 6/2007 |

OTHER PUBLICATIONS

Arpa Aydin et al: "CrowdCam: Instantaneous Navigation of Crowd Images Using Angled Graph", 2013 International Conference on 3D Vision, Jun. 29, 2013, pp. 422-429.
(Continued)

*Primary Examiner* — Jeffery A Brier
(74) *Attorney, Agent, or Firm* — Condo Roccia Koptiw LLP (57) ABSTRACT

A method for navigating through a set of images depicting a scene comprises providing a graph representation of correlations of the images and receiving input for navigation that includes an indication of a current image and weight information to control weights to be given to a plurality of measures of similarities of edges in the graph. The indication of the current image is used to determine a current node in the graph representation. At least one best ranked transition image is determined related to the current image by an edge from the current node, said determining comprising using the weight information to weigh the plurality of measures of
(Continued)

similarities for forming a combined measure of similarity for edges from the current node, and selecting the at least one best ranked transition image based on a comparison of the combined measure of similarity for the edges from the current node.

14 Claims, 7 Drawing Sheets

(51) Int. Cl.
  *H04N 7/18* (2006.01)
  *G06K 9/46* (2006.01)
  *G06K 9/62* (2006.01)
(52) U.S. Cl.
  CPC .. *G06F 17/30259* (2013.01); *G06F 17/30958* (2013.01); *G06K 9/4604* (2013.01); *G06K 9/6267* (2013.01); *H04N 7/185* (2013.01)

(56) References Cited

U.S. PATENT DOCUMENTS

| | | | | |
|---|---|---|---|---|
| 7,233,843 | B2* | 6/2007 | Budhraja | H02J 3/008 700/291 |
| 7,961,986 | B1 | 6/2011 | Jing et al. | |
| 8,060,259 | B2* | 11/2011 | Budhraja | H02J 3/008 700/291 |
| 8,065,156 | B2* | 11/2011 | Gazdzinski | G06Q 30/0251 704/275 |
| 8,290,778 | B2* | 10/2012 | Gazdzinski | G06Q 30/0251 704/270 |
| 8,296,146 | B2* | 10/2012 | Gazdzinski | G06Q 30/0251 187/396 |
| 8,356,035 | B1* | 1/2013 | Baluja | G06F 17/30247 707/741 |
| 8,401,710 | B2* | 3/2013 | Budhraja | H02J 3/008 700/291 |
| 8,509,525 | B1 | 8/2013 | Urbach et al. | |
| 8,712,777 | B1* | 4/2014 | Gazdzinski | G06Q 30/0251 187/396 |
| 8,719,037 | B2* | 5/2014 | Gazdzinski | G06Q 30/0251 187/396 |
| 8,719,038 | B1* | 5/2014 | Gazdzinski | G06Q 30/0251 369/24.01 |
| 8,732,187 | B1 | 5/2014 | Jing et al. | |
| 8,781,839 | B1* | 7/2014 | Gazdzinski | G06Q 30/0251 369/30.01 |
| 2007/0110338 | A1 | 5/2007 | Snavely et al. | |
| 2007/0203940 | A1* | 8/2007 | Wang | G06F 17/30864 |
| 2011/0176737 | A1 | 7/2011 | Mass et al. | |
| 2012/0209514 | A1* | 8/2012 | Chrysanthakopoulos | G06F 17/3079 701/431 |
| 2013/0106896 | A1 | 5/2013 | De Pauw et al. | |
| 2014/0081881 | A1 | 3/2014 | Radhakrishnan | |
| 2014/0267600 | A1* | 9/2014 | Arcas | H04N 13/0011 348/42 |
| 2014/0362108 | A1* | 12/2014 | Aguera-Arcas | G06T 17/005 345/629 |

OTHER PUBLICATIONS

Lowe, David G. "Distinctive image features from scale-invariant keypoints." *International journal of computer vision* 60.2 (2004): 91-110.
Bay, Herbert, Tinne Tuytelaars, and Luc Van Gool. "Surf: Speeded up robust features." *Computer Vision—ECCV 2006.* Springer Berlin Heidelberg, 2006. 404-417.
Rublee, E., Rabaud, V., Konolige, K., & Bradski, G. "ORB: an efficient alternative to SIFT or SURF." *Computer Vision (ICCV), 2011 IEEE International Conference on.* IEEE, 2011.
Sivic, Josef, and Andrew Zisserman. "Video Google: A text retrieval approach to object matching in videos." *Computer Vision, 2003. Proceedings. Ninth IEEE International Conference on.* IEEE, 2003.
Hartley, Richard, and Andrew Zisserman. *Multiple view geometry in computer vision.* Cambridge university press, 2003.
Dalal, Navneet, and Bill Triggs. "Histograms of oriented gradients for human detection." *Computer Vision and Pattern Recognition, 2005. CVPR 2005. IEEE Computer Society Conference on.* vol. 1. IEEE, 2005.
Cortes, Corinna, and Vladimir Vapnik. "Support vector machine," *Machine learning.* 20.3 (1995): 273-297.
Bengio, Yoshua. "Learning deep architectures for AI" *Foundations and trends® in Machine Learning* 2.1 (2009): 1-127.

* cited by examiner

METHODS FOR NAVIGATING THROUGH A SET OF IMAGES

CROSS REFERENCE TO RELATED APPLICATIONS

This application is the National Stage Entry under 35 U.S.C. § 371 of Patent Cooperation Treaty Application No. PCT/EP2015/065024, filed Jul. 1, 2015, which claims the benefit of Swedish Patent Application No. 1450844-4, filed Jul. 4, 2014, the disclosures of which are hereby incorporated by reference in their entireties.

TECHNICAL FIELD

The present invention relates to the use of a set of images stored in a database to provide a user a possibility to be shown images of a scene and, in particular, guiding a user through the set of images in order to be navigated through the scene.

BACKGROUND OF THE INVENTION

In the information age of today, the use of images is becoming increasingly popular. In particular, images depicting the world surrounding us are frequently used for all kinds of purposes. The images may be available via Internet, such that people may have access to the images from a web browser on a computer or a mobile phone. For instance, images of places may be associated with a map such that it is possible for a user to look at a view of a point of interest on the map or that a user may be presented with views along a route for facilitating finding the way between two locations.

Also, images may easily be captured e.g. by means of pocket-size cameras or mobile phones that are provided with a camera function. In fact, many people carry a camera in their mobile phone all the time and are able to take a photo whenever it is desired. Hence, a database of images of the world surrounding us may quickly be provided with a large number of images if any user in the world is allowed to contribute images to the database.

An application that enables a user to navigate, i.e. to switch the image that is being viewed in order to experience moving through a scene, through a set of images in a database may be optimized for providing the best possible experience to the user navigating through the images. Typically, the database is provided with the images that are desired for providing a good experience to the user and relationships between the images are defined in order to correlate the images to each other such that navigation through the images is provided in a desired manner. The correlation of the images to each other may be adapted to the specific application in order to optimize the experience provided to the user as the user navigates through the images.

An example of an application providing navigation through images that may be captured by users of an application is described in Arpa, A. et al, "CrowdCam: Instantaneous Navigation of Crowd Images Using Angled Graph", 2013 International Conference on 3D Vision—3DV 2013, pages 422-429. The application provides a possibility for users to capture photos of an event and to share the photos to take advantage of each others' perspectives such that navigation through views of the event from different perspectives is possible. The photos are represented as vertices of a weighted graph, where edge weights describe similarity between pairs of images. Angles of the graph are defined as a pair of edges with a common vertex. The weighted graph may be augmented with a set of angles forming a weighted angle graph including angle weights, which penalize turning along the corresponding angle. The weighted angled graph is formed so as to promote straight paths through the graph. Hence, the weighted angled graph is also constructed so as to adapt the weights to the desired experience when a user navigates through the graph.

In order to enable a user to navigate through images using an application for a specific purpose, the provider of the application needs to collect the set of images through which navigation is to be enabled. This implies that several providers may need to collect images of the same scene in order to each be able to provide their application to users. It would therefore be desirable to enable use of one database of images for several types of applications such that the respective providers of applications need not collect their own set of images.

SUMMARY OF THE INVENTION

It is an object of the invention to at least partly overcome the above-identified problems. It is another object of the invention to provide methods in relation to navigation through a set of images depicting a scene, wherein intelligent navigation through the set of images is enabled.

These and other objects of the invention may at least partly be met by means of the invention as defined by the independent claims.

According to a first aspect of the invention, there is provided a method for navigating through a set of images depicting a scene, said method comprising: providing a graph representation of correlations of the images, said graph representation comprising nodes and edges, wherein a node represents an image and comprises image information including at least a geographical position of an image capturing sensor when acquiring the image, image content information describing an object depicted in the image, and image property information, and wherein an edge represents a transition between two images and comprises similarity information providing a plurality of measures of similarities between the two images, said plurality of measures comprising at least a geographical distance measure, a measure of difference in image content, and a measure of difference in an image property; receiving input for navigation through the set of images, said input comprising an indication of a current image in the set of images and weight information to control weights to be given to the plurality of measures of similarities of edges in the graph; accessing the graph representation, wherein the indication of the current image is used to determine a current node in the graph representation; and determining at least one best ranked transition image that is related to the current image by an edge from the current node, said determining comprising using the weight information to weigh the plurality of measures of similarities for forming a combined measure of similarity for each edge from the current node; and selecting the at least one best ranked transition image based on a comparison of the combined measure of similarity for the edges from the current node.

According to a second aspect of the invention, there is provided a method for navigating through a set of images depicting a scene, said method comprising: providing a graph representation of correlations of the images, said graph representation comprising nodes and edges, wherein a node represents an image and comprises image information including at least a geographical position of an image capturing sensor when acquiring the image, image content information describing an object depicted in the image, and image property information, and wherein an edge represents a transition between two images and comprises similarity information providing a plurality of measures of similarities between the two images, said plurality of measures comprising at least a geographical distance measure, a measure of difference in image content, and a measure of difference in an image property; receiving input for navigation through the set of images, said input comprising an indication of a start geographical position, a target geographical position, and weight information to control weights to be given to the plurality of measures of similarities of edges in the graph; accessing the graph representation, wherein the start geographical position is used to determine a set of possible start nodes in the graph representation, said possible start nodes having a geographical position within a distance of the start geographical position that is smaller than a set threshold, and wherein the target geographical position is used to determine a set of possible target nodes in the graph representation, said possible target nodes having a geographical position within a distance of the target geographical position that is smaller than a set threshold; and determining a best ranked path from a start node within the set of possible start nodes to a target node within the set of possible target nodes, said path comprising edges connecting the start node to the target node, said determining comprising using the weight information to weigh the plurality of measures of similarities for forming a combined measure of similarity for edges; determining a sum of the combined measures of similarity for each path of edges connecting a start node in the set of possible start nodes to a target node in the set of possible target nodes; and selecting the best ranked path based on a comparison of the sum of combined measures of similarity for the paths.

The invention provides a plurality of information types that are associated with a node in the graph. Hence, the similarity information of an edge representing a transition between two images may also comprise a plurality of measures providing different aspects of the similarity between the two images. The graph therefore contains a great amount of information correlating the images according to several aspects of similarity.

Further, input for navigation through the set of images may be received providing weight information to control weights to be given to the plurality of measures of similarities of edges in the graph. This implies that input may be provided after the graph has been formed in order to control weights of the plurality of measures of similarities of an edge. The input may e.g. control which aspect of similarity that is most important in order to provide a best ranked transition image in relation to a current image based primarily on such chosen aspect. Hence, an application may provide input with weight information in order to be able to receive a best ranked transition image that best fits the experience of navigation that the application wants to provide to a user.

Several different applications may use the possibility to provide input for navigation, so that each application may set its desired weights of the plurality of measures of similarities. Therefore, the several different applications may utilize the same graph representing the set of images in order to each make use of the same set of images for presenting navigations through images.

In other words, the weights of the plurality of measures of similarities of an edge may be dynamically controlled. The dynamic control may ensure that the weights fit different applications that want to make use of the set of images.

According to an embodiment, the input for navigation is received from an application enabling a user to navigate through the set of images, the method further comprising sending output to the application. The output may comprise an indication of the selected at least one best ranked transition image or an indication of the selected best ranked path.

It is contemplated that input may be simultaneously provided from several different applications. The input may be used in order to calculate a specific result using the inputted weight information such that the application may be provided with the desired output. Such calculations may be quickly performed such that an output response to the application may be quickly provided. This implies that the graph representation may simultaneously serve several applications with output to be used in navigation through the set of images, while different weights are used by the different applications so that each application is optimized to the experience in the navigation through the images that is desired.

In the context of the present application, the term "scene" should be construed as any type of real-life environment that may be depicted in an image. Hence, the set of images may for instance depict a landscape, an urban environment, indoor or outdoor environment. Also, the set of images depicting a scene does not imply that each of the images in the set share some common area being depicted. In fact, the set of images may include a number of images of different parts of a town, so that the term "scene" should include a large area that may not be depicted in a single image. In fact, the set of images may together depict a very large area, such as an entire town, a country, or even large parts of the world.

Further, the term "image capturing sensor" should be construed as the actual sensor that is capturing an image, such as a charge-coupled device (CCD) sensor or a complementary metal-oxide semiconductor (CMOS) sensor. The image capturing sensor may acquire the information that forms the image, such as an array of pixel values. The image capturing sensor is thus typically part of a larger device, which may comprise further sensors for acquiring supplemental information relating to the image.

Also, the term "at least one best ranked transition image" should be construed as one best ranked transition image or a list of two or more best ranked transition images. In some embodiments, it may be desirable to obtain a list of the k best ranked transition images. The list may be presented in a descending order according to rank, such that the individually best ranked image is presented first in the list. Then, an application or a user may select one of the listed images to be viewed so that an alternative to the individually best ranked image may be selected.

According to an embodiment of the first aspect of the invention, the similarity information of an edge comprises transition classifier information, the transition classifier information specifying which of a predefined, finite number of classes that the transition between the two images belongs to, wherein each predefined class defines a type of transition between the two images according to a difference in the geographical position and a difference in a viewing angle of the image capturing sensor when acquiring the image.

This implies that the transition between images may be classified in advance such that a best ranked transition image according to a specific transition from a current image may be quickly determined.

According to a further embodiment, said determining of at least one best ranked transition image comprises determining at least one best ranked transition image for each type of transition and said output comprises an indication of the selected at least one best ranked transition image for each type of transition.

Hence, when a current image is presented, a best ranked transition image may be provided in advance for each type of transition from the current image. This implies that an application may present the current image with indications of available transitions and already be provided with at least one best ranked transition image for each type of transition so as to be able to quickly present such a transition image when requested by a user.

According to another embodiment, the input for navigation further comprises an indication of a selected type of transition and said determining of at least one best ranked transition image further comprises determining whether the transition classifier information of an edge from the current node corresponds to the selected type of transition and, in selecting the at least one best ranked transition image, considering only the edges from the current node that do correspond to the selected type of transition. This implies that only the transitions that are classified as corresponding to a desired transition may need to be considered, which may considerably speed up selection of a best ranked transition image.

According to an embodiment, the image property information comprises information of brightness of the image and/or color properties of the image.

This implies that the images may be related to each other with regard to properties of the image. When switching an image that is presented to a user, maintaining a brightness of the image or color properties of the image fairly constant may considerably improve the user experience.

According to an embodiment, the image information of a node further comprises metadata information, which is acquired by a sensor different than the image capturing sensor, said metadata information comprising at least a compass direction of the image capturing sensor when the image was acquired, and wherein the similarity information of an edge further comprises a measure of difference in metadata. This enables providing a measure of similarity that accounts for a viewing angle of the image capturing sensor when acquiring the image.

The metadata information may further comprise a sequence identifier defining that the image is acquired as part of a temporal sequence of images, wherein the measure of difference in metadata accounts for whether the images are part of a common temporal sequence. By correlating images as being part of a temporal sequence, a movement of a user capturing images through a scene may be followed.

As described above, several applications may commonly use a set of images. Thus, the provider of an application for navigating through the set of images need not perform the actual collection of the set of images.

It would be desirable that images may be added to the set of images at any time. Hence, the set of images may be gradually enlarged so as to add new images depicting new parts of the scene or add new images providing better views, e.g. for a specific application for navigating through the set of images.

According to a third aspect of the invention, there is provided a method of adding an image to a set of images depicting a scene for enabling navigation through the set of images, said method comprising: providing a graph representation of correlations of the images, said graph representation comprising nodes and edges, wherein a node represents an image and comprises image information including at least a geographical position of an image capturing sensor when acquiring the image, image content information describing an object depicted in the image, and image property information, and wherein an edge represents a transition between two images and comprises similarity information providing a plurality of measures of similarities between the two images, said plurality of measures comprising at least a geographical distance measure, a measure of difference in image content, and a measure of difference in an image property; receiving a current image that is to be added to the set of images and information of a geographical position and a viewing angle of an image capturing sensor when acquiring the image; extracting image content information and image property information from the current image; forming a current node in the graph representation, said current node representing the current image and including at least the geographical position of an image capturing sensor when acquiring the image, image content information describing an object depicted in the image, and image property information; determining a subset of the images in the graph representation to which the image is to be related, said determining of a subset comprising: finding candidate images in the set of images which are related to the current image by a difference between the candidate image and the current image according to at least one first pre-defined measure of similarity being smaller than a set threshold; determining at least one second pre-defined measure of similarity between the current image and the candidate image; and determining whether the difference between the current image and the candidate image according to the at least one second pre-defined measure of similarity is smaller than a set threshold in order to select the candidate image as part of the subset of images; and for each image in the subset: determining similarity information between the current image and the image in the subset, wherein determining similarity information includes determining transition classifier information, the transition classifier information specifying which of a predefined, finite number of classes that the transition between the current image and the image in the subset belongs to, wherein each predefined class defines a type of transition between the two images according to a difference in the geographical position and a difference in a viewing angle of the image capturing sensor when acquiring the image; and forming an edge in the graph representation representing the transition between the current image and the image in the subset, said edge comprising similarity information including transition classifier information.

When receiving an image to be added to the set of images, information is extracted from the image and the image is related to the relevant images that are already part of the set. In this regard, similarity information is determined between the image to be added and each relevant image in the set of images.

According to the third aspect of the invention, the determining of similarity information includes determining transition classifier information. The transition classifier information classifies the type of transition between the two images into a predefined class. This implies that the graph is provided with predefined classes of types of transition that may later be used by an application to find a transition within a specific class. By means of the transitions being classified, the application may quickly find a best ranked transition image within a specific type of transitions.

For instance, if a user wants to turn left from an image that is currently viewed in an application, the best ranked transition image for turning left in the image may be quickly found.

The finding of candidate images may be performed by comparing the current image to the images in the set of images according to one or more quickly computed measures of similarity. Hence, the first pre-defined measure of similarity may be a geometrical distance measure. Then, the candidate images may be determined as the images being within a set geographical distance from the current image. Alternatively or additionally, the first pre-defined measure of similarity may be a measure of difference in image content, such as a measure of difference in a quantized representation of the content in the image. The first pre-defined measures of similarity allow candidate images to be quickly selected in the set of images so that a complete comparison between the current image and each image in the set of images is not necessary.

Further, the second pre-defined measure of similarity may be a measure of difference in image content, which may require image analysis of the current image to the candidate image in order to be computed. For instance, the second pre-defined measure may be relating to a geometric relationship between the images. Hence, the determining of the second pre-defined measure may be more computationally complex than the determining of the first pre-defined measure. Therefore, it would be advantageous to only perform the determining of the second pre-defined measure of similarity for the candidate images.

The at least one second pre-defined measure of similarity may alternatively be a combined measure of similarity using a plurality of measures of similarity, which may include a geographical distance measure, a measure of difference in image content and a measure of difference in an image property.

The threshold of the at least one second pre-defined measure of similarity should be set so that only the candidate images which are sufficiently similar to the current image are selected. Hence, edges in the graph representation will only be formed between the current node and nodes representing images that are sufficiently similar to the current image.

The method of adding an image may further comprise enabling a combined measure of similarity for an edge in the graph representation to be controlled on demand by input of weight information to weigh the plurality of measures of similarities in forming the combined measure of similarity for the edge. Hence, the weight information may be adapted to a desired type of navigation through a scene.

According to an embodiment, the method of adding an image further comprises receiving the current image from an application adapted to capture images for the graph representation, said application being arranged in a device comprising an image capturing sensor and being further arranged to acquire specific metadata from further sensors in the device to connect the metadata to the acquired image. This implies that the acquiring of images may be controlled so as to acquire the specific information desired to be used in the graph representation.

BRIEF DESCRIPTION OF DRAWINGS

These and other aspects of the present invention will now be described in further detail, with reference to the appended drawings showing embodiment(s) of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
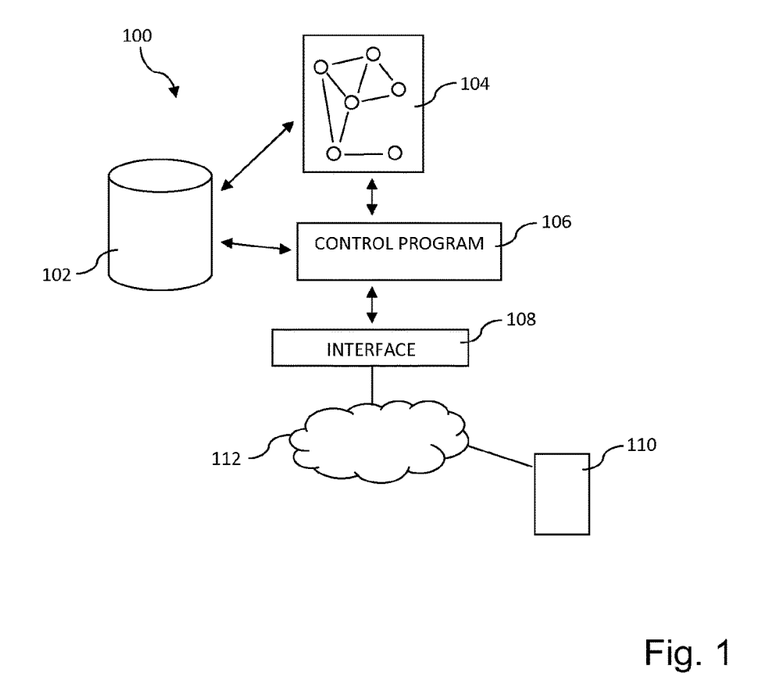
FIG. 1 is a schematic view of a system providing a graph representation of a set of images.

Referring now to FIG. 1, a system 100 for providing navigation through a set of images depicting a scene is shown. The system 100 comprises a database 102 storing the set of images. The system 100 further comprises a data structure 104 providing a graph representation of correlations of the images. Also, the system 100 comprises a control program 106 which may access the data structure 104 in order to retrieve information on correlations of the images from the graph representation. The control program 106 may also access the database 102 directly in order to retrieve images stored in the database 102. The system 100 further comprises an interface 108 for providing a communication channel between the control program 106 and outside applications 110. Such applications 110 may access the interface 108 via a network 112, which may be e.g. a mobile communications network, a local computer network or a global computer network, such as the Internet.

The database 102 may store the set of images comprising a data record for each image. The database 102 may further comprise supplemental information relating to each image, as will be further described below. The database 102 and the data structure 104 may be provided on one or more computer servers. The control program 106 may be run on such a computer server or on a computer having access to the one or more computer servers on which the database 102 and the data structure 104 are provided.

The interface 108 may be any type of communication interface allowing an application 110 to exchange information with the control program 106. According to an embodiment, the interface 108 is implemented as an Application Programming Interface (API), which provides a set of pre-defined instructions that the application 110 may use in order to request actions from the control program 106.

The application 110 may be installed and run by a user on a computing device, such as a desktop computer or a mobile phone. The application 110 may also comprise a client program, which is installed and run by the user. The client program may provide access to a server program, e.g. via an Internet connection, wherein the server program of the application communicates with the control program 106.

The application 110 may provide the user with a possibility to view the images in the set of images and to switch which image that is to be viewed so that the user may experience navigation through the set of images.

Figure 2:
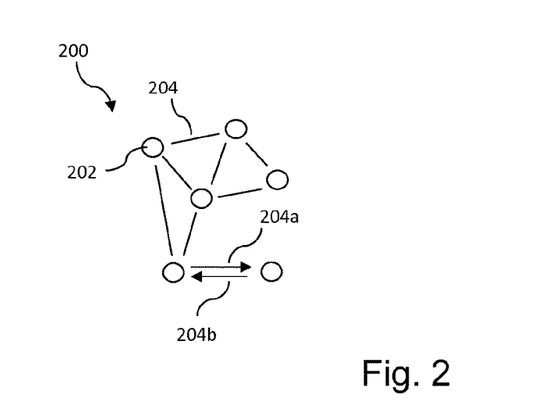
FIG. 2 is a schematic view of the graph representation.

Referring now to FIG. 2, the graph representation 200 of correlation of images will be further described. The graph representation 200 comprises nodes 202 and edges 204, each connecting two nodes 202.

A node 202 in the graph 200 represents an image. The node 202 comprises information of an address to the image in the database 102, whereby the control program 106 may be quickly provided with a pointer to the image in the database 102.

The node 202 further comprises image information relating to the image. The image information may comprise data measured by sensors different from an image capturing sensor that acquired the image and information derived from image analysis.

As will be further described below, a mobile phone may run an application for acquiring images to be added to the set of images. The application for acquiring images may then collect data from specified sensors in the mobile phone. However, the data measured by sensors different from the image capturing sensor may be automatically collected by a camera or mobile phone without the need to run a specific application for acquiring the images. Hence, the sensors different from the image capturing sensor may be arranged in the same device that incorporates the image capturing sensor. The data measured by sensors different from the image capturing sensors relate to the image and is hereinafter referred to as metadata.

The metadata may comprise a geographical position of the image capturing sensor when acquiring the image, so as to provide a geo-tag of the image. The geographical position may typically be provided as a Global Positioning System (GPS) position providing a longitude and a latitude value of the geographical position.

The metadata may further comprise a compass direction of the image capturing sensor when acquiring the image in order to provide information of what direction is viewed in the image from the geographical position. Further, the metadata may comprise altitude information providing information of from what altitude the image was acquired. Also, the metadata may comprise information of an acceleration vector of a device incorporating the image capturing sensor in order to provide information of a direction of movement of the device.

The metadata may further comprise a capture time, providing information of the date and time that the image was acquired. Also, the metadata may comprise a sequence identifier, which indicates that the image was acquired as part of a temporal sequence of images and provides the order of the image in the temporal sequence.

The metadata may further comprise information on the image orientation, such as whether the image is taken in portrait or landscape orientation or in a tilted orientation.

The metadata may further comprise camera intrinsic parameters, such as model of the camera, focal length or exposure time.

The metadata may further comprise information about the user that captured the images, such as a user identifier.

The information derived from the image analysis in the node 202 may comprise image property information. The image property information may comprise information of brightness of the image, such as a measure of the intensity of the image. The image property information may further comprise color properties of the image, such as a color histogram providing intensity distribution of different color channels in the image. The image property information may also comprise blurriness information providing a measure of how blurred the image is. The image property information may be provided as averaged features of the entire image or as local features for a part of the image.

The information derived from the image analysis in the node 202 may also comprise image content information describing an object depicted in the image. The image content information may comprise information regarding local interest points and features, which may be obtained e.g. by Scale-Invariant Feature Transform (SIFT), Speeded-Up Robust Features (SURF), Oriented FAST (features from accelerated segment test) and Rotated BRIEF (binary robust independent elementary features) (ORB), Karhunen-Loève Transform (KLT), Gradient Location and Orientation Histogram (GLOH), or Local Energy based Shape Histogram (LESH). The image content information may further comprise a Bag-Of-Words (BOW) representation of local features in the image, i.e. a histogram of quantized local features against a dictionary of objects that are present in the set of images. The image content information may further comprise a scene classification label, which may e.g. provide a classification whether the image depicts an urban or natural scene.

An edge 204 in the graph 200 connects two nodes 202 to each other. The edge 204 represents a transition between the two images represented by the two nodes 202 connected by the edge 204. The edge 204 comprises similarity information providing a plurality of measures of similarities between the two images.

The measures of similarities may quantify the similarity between the two images based on any of the types of image information provided in the nodes 202. The measures of similarities may also comprise measures based on analysis of the images in relation to each other, so that a measure of similarity may not be directly obtained merely from the image information extracted from the images and provided in the nodes 202.

The pairwise correlations or relationships between the images are quantified in order to allow selecting edges 204 between nodes 202 in a geographically and visually related manner. For example, the following measures of similarities may be computed or extracted between image nodes: a geographical distance measure, a relative position, a relative viewing angle, a color difference, a BOW difference, a geometric relationship and a number of feature matches with the corresponding geometric verification.

Specifically, the geographical distance d and the relative position $P_r$ between two nodes 202 may be computed given the longitude and latitude values of the nodes 202. Relative viewing angle $A_r$ may be derived either from the compass direction of the nodes 202 or from relative pose estimation that may be determined based on computer vision analysis of the two images.

The color difference $C_d$ and the BOW difference $B_d$ may be calculated based on the difference between the color histograms and the BOW histograms. The difference between histograms may be any distance measure between two vectors of the same length e.g. a distance in normalized $l_2$-norm or $l_1$-norm. The color difference $C_d$ may form a measure of difference in image property between the images, whereas the BOW difference $B_d$ may form a measure of difference in image content between the images.

For two images of the same scene taken from different positions or angles, the geometric relationship may be estimated from matching local features. The local features that are matched may be part of image content information of the nodes 202 being derived from image analysis as described above. For instance, local features in the images may be matched and the relationship of the positions of the matched features in the two images may be used for determining a geometric relationship of the images by means of e.g. epipolar geometry or homography.

Figure 3:
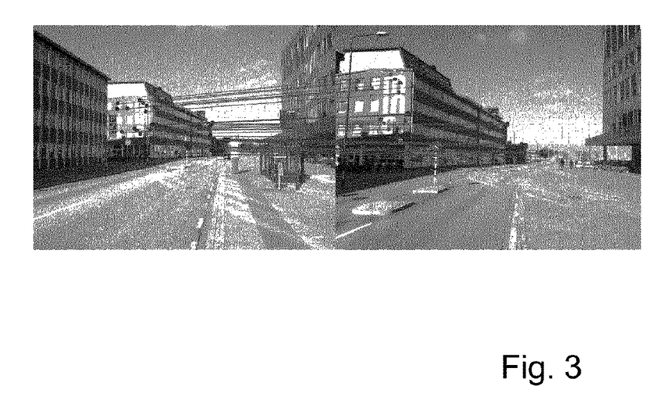
FIG. 3 is a view of two images illustrating determination of a geometric relationship between the images.

FIG. 3 illustrates matching local image features being detected in two images. The matching features are marked by dots in the images. The geometric relationship between the images may be determined by relating the positions of these features to each other, as marked by lines between the dots in FIG. 3. Using the matched local image features, an epipolar geometry between the images may be determined.

Alternatively, a homography relationship may be determined. In particular, homography relationships exist between a stitched panorama image and the images that constitute the panorama image.

By means of the determined geometric relationship, using epipolar geometry or homography as described above, a measure of the geometric relationship may be formed. A transformation matrix describing a transformation between the images may be used for providing the measure of the geometric relationship. For instance, a rotation angle and/or a deformation may be derived from the transformation matrix, and may constitute the measure of the geometric relationship. The thus estimated geometric relationship G may then form a measure of difference in image content between the images. Further, during the determination of the geometric relationship, the number of matched local features in the images may be determined. This number of matches m may also form a measure of difference in image content between the images.

The measures of similarities may also comprise further measures of differences in metadata. For instance, the capture times of the images may be used in several different ways. As one measure of difference in metadata, an absolute difference in time may be used. However, other differences in capture time may be used, such as a difference in time of day or a difference in time of year. A difference in time of day may provide an indication of the light conditions in the image, e.g. if the image is captured at night time or in broad daylight. A difference in time of year may provide an indication of the season, which may affect the environment depicted in the images, such as whether trees have leaves or not.

A difference in metadata may be expressed as a binary match, e.g. whether the user identifier is the same or whether the images are part of a common temporal sequence. Also, a time of year information may be used as a binary match indicating whether the images are captured in a common season.

The similarity information of an edge may comprise transition classifier information, which classifies the transition between the two images into one of a number of predefined classes. These predefined classes may classify transitions into different movements and may therefore use the geographical position and a viewing angle as given e.g. by the compass direction. With regard to the relative position between the images and the relative viewing angle of the images, types of transition between the two images may be defined.

Figure 4:
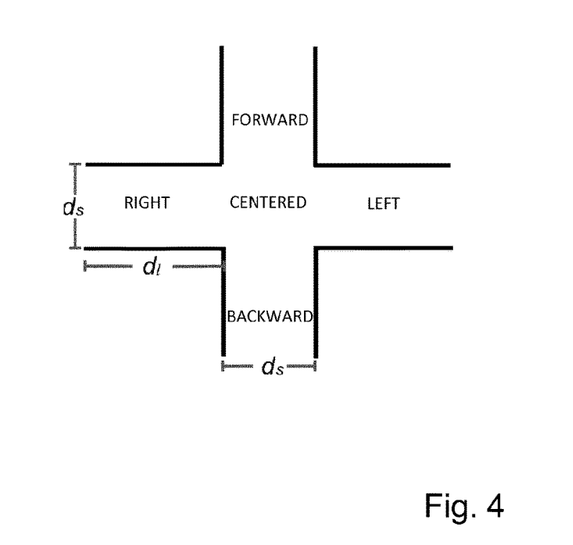
FIG. 4 is a schematic view indicating classification of transitions between images into predefined classes.

Referring now to FIG. 4, an example of classification of types of transitions is shown. The relative position between a first image and a second image may be quantized to one of the classes "centered", "forward", "backward", "left" and "right". As shown in FIG. 4, the relative position of the second image in relation to the first image is considered in two directions, a forward-backward direction and a left-right direction. If the relative position is within a distance $d_s$ in both directions, the relative position is quantized as "centered". If the relative position is within a distance $d_l$ in one direction and within a distance $d_s$ in the other direction, the relative position is quantized as "forward", "backward", "left", or "right". Similarly, the relative viewing angle may be quantized as "forward", "backward", "left", or "right".

The combinations of the relative position and the relative viewing angle may be used for forming the types of transitions. For example, the combination of relative position="centered" and relative viewing angle="backward" may be defined as the class "turning-around".

Using classification of types of transitions, the edges 204 in the graph 200 may need to be directed edges 204 representing a direction between nodes 202 in the graph 200. Hence, two nodes 202 may be connected by two edges 204, wherein a first edge 204a represents a transition from a first image represented by a first node to a second image represented by a second node and a second edge 204b represents a transition from the second image represented by the second node to the first image represented by the first node. For instance, if the first edge 204a has transition classifier information corresponding to "moving forward", then the second edge 204b would have transition classifier information corresponding to "moving backward".

Each edge 204 may provide a combined measure of similarity using the similarity information of the edge 204. The combined measure of similarity may be formed as a weighted sum of the plurality of measures of similarities of the edge 204. The combined measure of similarity may also be formed using a sum/norm of any linear combination of the similarity measures. The combined measure of similarity may also be formed using any type of classifier function that gives a scalar value, such as Support Vector Machine (SVM) or probabilistic classifiers such as Bayes classifier.

The graph representation 200 allows comparison of the edges 204 from a node 202 in order to find a best ranked transition from the node 202, by finding the edge 204 from the node 202 with the highest score of the combined measure of similarity. The best ranked transition from the node 202, may also be found by applying one or more classifiers on the combined measures of similarity of the edges 204. For example, a hyperplane, a support vector machine (SVM) or a deep neural network may be applied.

Starting from a current node 202, which may represent an image that is currently viewed by an application 110, a list of the top ranked transitions from the current node 202 may be determined. Hence, a plurality of best ranked transition images may be found so as to enable the application 110 to select one of the images from the list.

Figure 5:
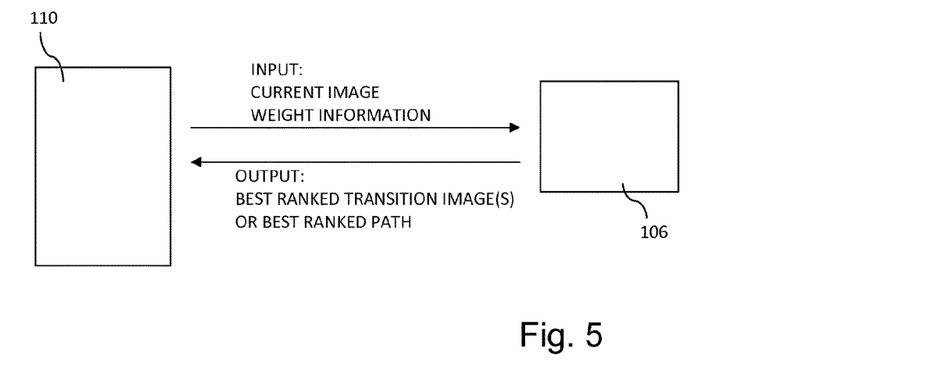
FIG. 5 is a flowchart illustrating communication between an application and a program having access to the graph representation.

Referring now to FIG. 5, the communication between the application 110 and the control program 106 will be further discussed.

The application 110 may provide presentation of images to a user. The application 110 may in this regard present one or more of the images in the set of images depicting a scene to the user. Further, the application 110 may shift which image is presented to the user. In shifting which image that is presented, the application 110 may contact the control program 106 in order to determine a new image to be presented through the graph representation 200. The user may provide input to the application 100 in order to control the application 110 to shift which image is presented.

The application 110 may communicate with the control program 106 through pre-defined instructions provided by the API. The application 110 may thus make function calls to the control program 106, which may be sent as requests to the control program 106.

When it is desired to shift which image is presented, the application 110 may send a request to the control program 106, wherein the application 110 provides input for determining a best ranked image to be shifted to. The input may comprise an indication of a current image in the set of images, such as an indication of a current node in the graph 200 which represents the current image. The input may further comprise weight information to control weights to be given to the plurality of measures of similarities.

Hence, the application 110 may through the weight information control which type of measure of similarities that should be emphasized in order to control how the best ranked transition image is determined in the graph 200.

A user of the application 110 may set parameters of the weight information so as to control the content of the weight information that is sent to the control program 106. Hence, the user of the application 110 may dynamically control the weight information.

The application 110 may alternatively always use the same weight information, which may be adapted to provide a specific experience to the user when shifting images that are presented by the application 110. The application 110 may send its weight information each time the application 110 contacts the control program 106. Alternatively, the application 110 may send weight information once to the control program 106 so that the control program 106 may store and access this weight information each time a request to determine a best ranked image is received.

The weight information may be used in order to control which type of transition is desired. In this regard, emphasis may be given to any of the measures of similarities that have been discussed above in order to provide a desired result.

For instance, it may be desired to provide transitions to images that are geographically closest to the current image. In such case, a high weight may be given to a geographical distance measure, such as the geographical distance d. However, the set of images may be provided with a large number of images at very close distance to each other. Hence, it may be desired to provide transitions that are within a certain distance range to each other such that a high weight is give to the geographical distance d being within the desired range. Further, a high weight may be simultaneously given to the relative viewing angle $A_r$ such that when a plurality of transitions are presented, the movement through the scene may be close to a straight line. Also, a high weight may be given to a similarity in metadata, such as user identifier, which may be beneficial if a user has captured images while moving through the scene along a straight line.

In another situation, it may be desired to show an interesting object in the images from different points of view. In such case, a high weight may be given to a measure of difference in image content, such as the BOW difference $B_d$. Further, a high weight may be simultaneously given to the estimated geometric relationship G, which may utilize the object in determining the geometric relationship.

In yet another situation, it may be desired to present the scene while little change occurs in background or foreground information in the scene. For instance, it may be easthetically pleasing to a user if the switching of images does not change the lighting conditions at which the images were captured. Such lighting conditions may depend on time of day of capture of the images or on weather conditions. Further, it may be beneficial to use images that are captured close in time to each other, such that changes to buildings over the years will not be shown in the presented images. Also, the scene may change with season, such as trees having leaves or not. In such case, a high weight may be given to a measure of difference in image property, such as the color difference $C_d$ or a difference in brightness. Further, a high weight may be simultaneously given to an absolute difference in the capture time of images or to a difference in time of day of the capture time, which may ensure that lighting conditions are similar. Also, a high weight may be given to a time of year of the capture time, which may ensure that objects that change with season of the year do not change in the presented images. Further, a high weight may be given to the images being part of a common temporal sequence, and if so, the difference in order of the image in the sequence may also be considered.

The control program 106 may return a pointer to a best ranked transition image to the application 110. Alternatively, a list of the k best ranked transition images may be provided. The number of best ranked transition images that will be returned in the list may be controlled by the application 110 through the input provided to the control program 106. Alternatively, the number may be a default number that the control program 106 outputs to the application 110.

Further, the input from the application 110 may include a selected type of transition such that only edges 204 with corresponding transition classifier information should be considered. Then, the best ranked transition image(s) may be selected among the nodes 202 which are pointed to by an edge 204 with the corresponding transition classifier information.

Figure 6:
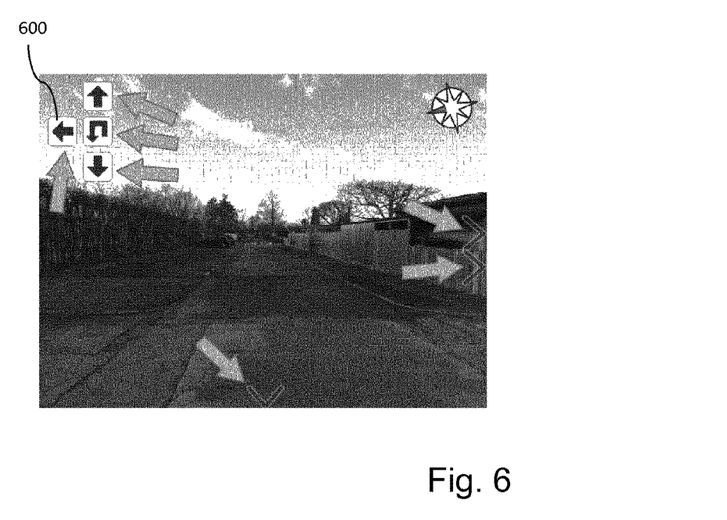
FIG. 6 is a view of an image illustrating available transitions from the image.

The application 110 may want to determine the best ranked transition image(s) according to any possible type of transition in advance of the user requesting that such transition is performed. Hence, when an image is to be presented by the application 110, the application 110 may request the control program 106 to determine the best ranked transition image(s) for each type of transition from the image that is to be presented by the application 110. Then, a list of best ranked transition image(s) for each type of transition may be returned to the application 110. The application 110 may present to the user an indication of which types of transitions that are possible from the image currently being presented, as shown in FIG. 6, where arrows 600 indicate the available types of transitions.

It may be desirable to present a sequence of images, providing a movement through the scene. The application 110 may allow a user to select a start geographical position and a target geographical position, e.g. in a map, in order to define a path through the scene. The application 110 may thus provide input to the control program 106 comprising an indication of the start geographical position and an indication of the target geographical position.

The control program 106 may determine a set of possible start nodes within a geographical distance d from the start geographical position and a set of possible target nodes within a geographical distance d from the target geographical position. Then, a best ranked path through the graph 200 from a start node to a target node may be determined using weight information provided by the application 110.

The application 110 may provide the indications of the start geographical position and/or the target geographical position as explicit indications of the desired nodes in the graph 200. For instance, the start geographical position may be provided as the current image that is presented by the application 110.

The output from the control program 106 may be an ordered set of images in a path p. With different measures of similarities, the combined measure of similarity of an edge e may be defined as $w_e(d, A_r, C_d, B_d, m)$. The full problem of finding a best path p from a start node $n_s$ to a target node $n_e$ can be formulated as $$\min_{p, n_s, n_e \in p} \sum_{e \in p} w_e(d, A_r, C_d, B_d, m).$$

Figure 7:
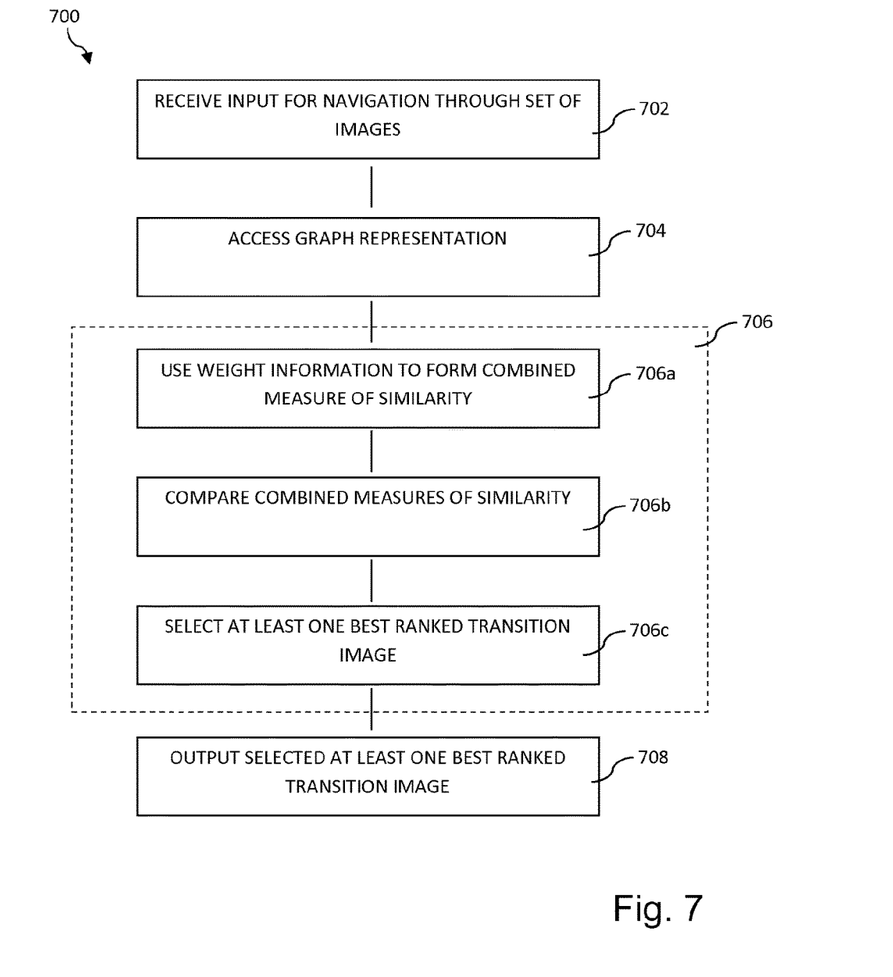
FIG. 7 is a flowchart of a method for navigating through a set of images according to a first embodiment of the invention.

Referring now to FIG. 7, a method 700 for determining at least one best ranked transition image will be described. The method 700 may be performed by the control program 106.

Input for navigation through the set of images is received, step 702. The input comprises an indication of a current image in the set of images and weight information.

Then, the graph representation 200 is accessed, step 704. The indication of the current image is used to determine a current node in the graph representation 200.

At least one best ranked transition image is determined, step 706. A best ranked transition image is represented by a node which is connected to the current node by one edge in the graph 200.

The determination of the at least one best ranked transition image comprises using the weight information, step 706a, to form a combined measure of similarity for edges from the current node. Further, the combined measures of similarities of the edges are compared to each other, step 706b. Based on the comparison, the at least one best ranked transition image is selected, step 706c.

Then, an indication of the selected at least one best ranked transition image may be output, step 708. The indication may be a pointer to an address in the database 102, from where the best ranked transition image may be retrieved.

Figure 8:
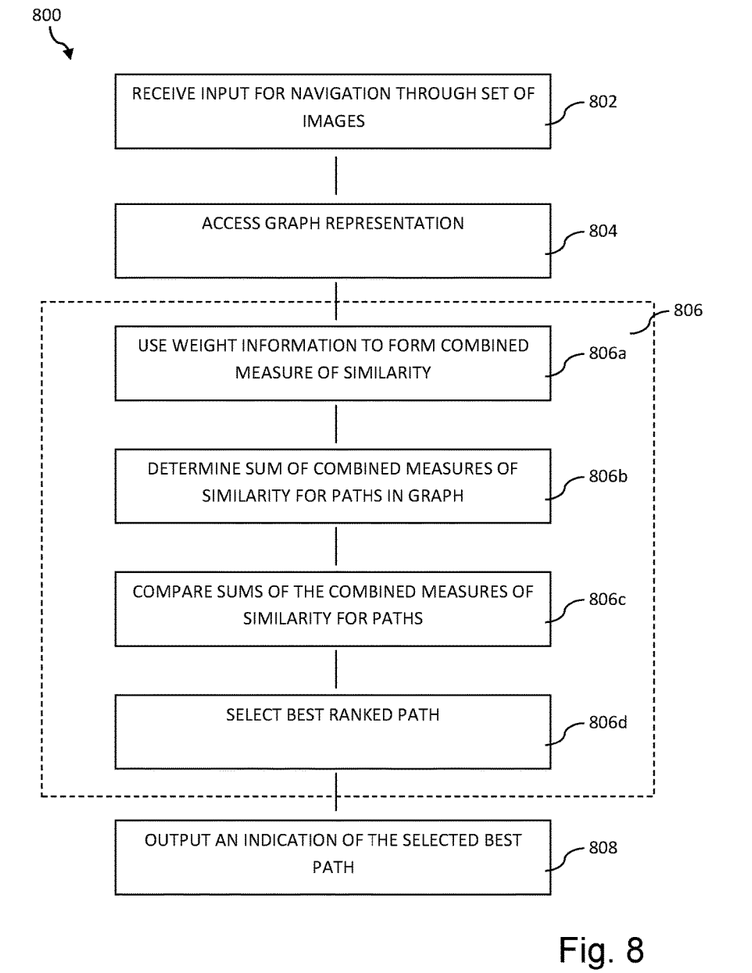
FIG. 8 is a flowchart of a method for navigating through a set of images according to a second embodiment of the invention.

Referring now to FIG. 8, a method 800 for determining at least one best ranked path will be described. The method 800 may be performed by the control program 106.

Input for navigation through the set of images is received, step 802. The input comprises an indication of a start geographical position and an indication of a target geographical position.

Then, the graph representation 200 is accessed, step 804. The indication of the start geographical position is used to determine a set of possible start nodes in the graph representation 200 and the indication of the target geographical position is used to determine a set of possible target nodes.

A best ranked path from a start node to a target node is determined, step 806. The best ranked path is represented by an order of nodes from the start node to the target node, which are connected by edges in the graph 200.

The determination of the best ranked path comprises using the weight information, step 806a, to form a combined measure of similarity for edges in the graph 200. Further, a sum of the combined measures of similarity for paths in the graph 200 from a start node to a target node are determined, step 806b. Then, the sums of the combined measures of similarity for the paths are compared to each other, step 806c. Based on the comparison, the best ranked path is selected, step 806d.

Then, an indication of the selected best path may be output, step 808. The indication may be an ordered list of pointers to addresses in the database 102, from where the order of images making up the selected best path through the graph 200 may be retrieved.

Figure 9:
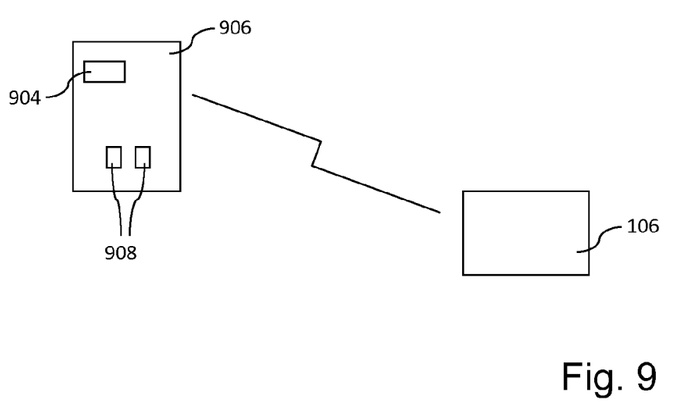
FIG. 9 is a schematic view of a system allowing images to be added to a graph representation of a set of images.

Referring now to FIG. 9, adding images to the set of images in the database 102 will be further described.

An image to be added may be acquired by means of any type of image capturing sensor 902. The image capturing sensor 904 may e.g be a CCD or CMOS sensor, which is incorporated in a device 906 that comprises further sensors 908 for detecting supplemental information regarding the image. For instance, the device 906 may be a camera, which typically comprises at least a clock for registering the capture time of an image. The camera may also comprise a GPS for registering a geographical position of the image capturing sensor 902 when acquiring the image. The device 906 may alternatively be a mobile phone having a camera and a number of other sensors for registering supplemental information.

The acquired image with any supplemental information may be provided from the device 906 to the control program 106 in order to be added to the graph representation 200 of the set of images. The control program 106 may extract desired image content information and image property information from the image. Further, the acquired image with all supplemental information and extracted image content information and image property information may be stored in the database 102. The database record may comprise information which is not used in the graph representation 200, such that if it is later desired to improve the graph representation 200 with addition of further information, such further information may be fetched from the database 102.

A new, current node may then be added to the graph representation 200 and this current node may be compared to the nodes in the graph 200 in order to form new edges between the current node and relevant nodes in the graph 200. In this regard, a set of candidate nodes are selected. For each candidate node, a further analysis should be made whether an edge should be formed between the current node and the candidate node. Edges may be formed in the graph 200 only if a measure of similarity between the current node and the candidate node is within a pre-set threshold.

First, the set of candidate nodes may be selected with respect to their geographical distance d to the current node (e.g. all nodes within a bounding box of radius $d_g$) or their BOW difference $B_d$ to the current node (e.g. all nodes with BOW difference $B_d$ less than a threshold $B_g$). The image of the current node may only be compared to the images of the candidate nodes for determining a geometric relationship between the images, since the geometric matching process may be too time-consuming for being performed to all nodes in the graph 200. When the geometric matching process has been performed between the current node and the candidate nodes, edges may be constructed between the current node and the candidate nodes where the number of matches m is larger than a pre-set threshold $t_g$.

The device 906 may be provided with an application which is adapted to capture images for the graph representation 200. The application may be arranged to acquire specific metadata from further sensors 908 in the device 906 when images are acquired, such that the desired metadata is acquired. The application may be provided by a provider of the graph representation 200, such that the provider ensures that the desired information is acquired in relation to acquired images.

Figure 10:
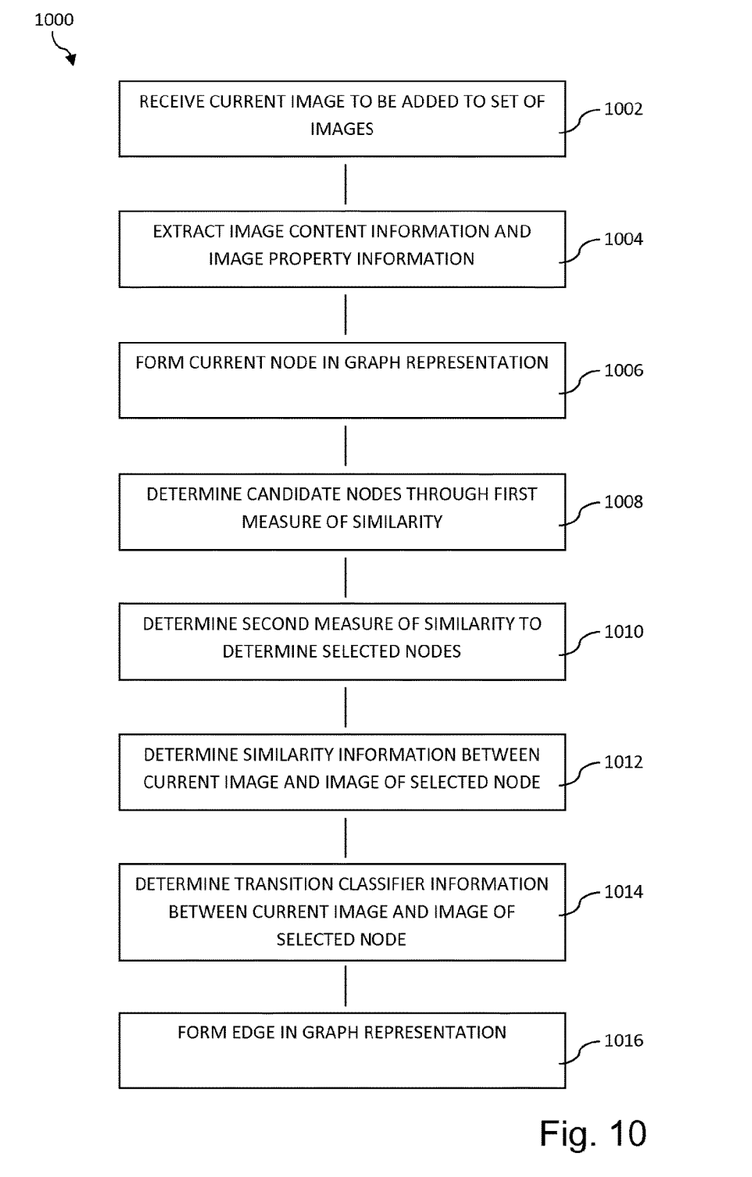
FIG. 10 is a flowchart of a method for adding an image to a set of images according to a third embodiment of the invention.

Referring now to FIG. 10, a method 1000 of adding an image to a set of images represented by a graph representation will be further described. The method 1000 may be performed by the control program 106.

A current image that is to be added to the set of images is received, step 1002, with information of a geographical position and a viewing angle of an image capturing sensor when acquiring the image. Image content information and image property information are extracted, step 1004, from the current image.

Then, a current node in the graph representation is formed, step 1006. The current node represents the current image and includes at least the geographical position of an image capturing sensor when acquiring the image, extracted image content information describing an object depicted in the image, and extracted image property information.

Candidate nodes representing a subset of the images in the graph representation are determined, step 1008. The candidate nodes may be determined by selecting nodes representing images having a difference in a first measure of similarity to the current image being smaller than a set threshold. For instance, the first measure of similarity may be geographical distance measure.

For each of the candidate nodes, at least one second measure of similarity is determined between the current image and the image represented by the candidate node in order to determine selected nodes, for which an edge should be formed between the current node and the selected node, step 1010. For each of the selected nodes, similarity information is determined, step 1012, between the current image and the image of the selected node. The determination of similarity information includes determining transition classifier information, step 1014, such that the transition between the current image and the image of the candidate node may be classified. Then, an edge in the graph representation is formed, step 1016, representing the transition between the current image and the image in the subset.

The person skilled in the art realizes that the present invention by no means is limited to the preferred embodiments described above. On the contrary, many modifications and variations are possible within the scope of the appended claims.

For example, the control program may provide an interface to the graph representation directly to a user. For instance, the control program may comprise a server program and a client program, wherein a user may run the client program on a computing device for providing input directly to the control program. Further, input of weight information may be provided to the control program through learning from a set of training data. The training data may provide information on which transitions have been considered best by users.

The invention claimed is:

1. A computer-implemented method for navigating through a set of images depicting a scene, the method comprising:
receiving the set of images from one or more mobile devices, the images captured by the one or more mobile devices;
providing a graph representation of correlations of the images, the graph representation comprising nodes and edges, wherein the images are stored on a data storage unit and shared by multiple applications, wherein each node of a first set of nodes among the nodes represents an image and comprises image information including at least a geographical position of an image capturing sensor when acquiring the image, image content information describing an object depicted in the image, and image property information, and wherein each edge of a first set of edges among the edges represents a transition between two images and comprises similarity information providing a plurality of measures of similarities between the two images, the plurality of measures of similarities being pre-defined and comprising a geographical distance measure, a measure of difference in image content, and a measure of difference in an image property, the providing of the graph representation comprising analyzing the two images in relation to each other to derive the pre-defined plurality of measures of similarities;
receiving input from at least one of the multiple applications for navigation through the set of images, the input comprising an indication of a current image in the set of images and weight information to control weights to be given to the plurality of measures of similarities of each edge of the first set of edges in the graph representation;
accessing the graph representation, wherein the indication of the current image is used to determine a current node in the graph representation; and
determining, through data processing on a data processing unit, at least one transition image that is related to the current image by an edge among the first set of edges from the current node, the determining comprising
using the weight information to weigh the plurality of measures of similarities for forming a combined measure of similarity for each one of a plurality of edges from the current node; and
selecting the at least one transition image based on a comparison of the combined measure of similarity for the each one of the plurality of edges from the current node.

2. The computer-implemented method according to claim 1, wherein the input for navigation is received from an application enabling a user to navigate through the set of images, the method further comprising sending output to the application, the output comprising an indication of the selected at least one transition image.

3. The computer-implemented method according to claim 2, wherein the similarity information of at least one edge among the first set of edges comprises transition classifier information, the transition classifier information specifying which of a predefined, finite number of classes that the transition between the two images belongs to, and wherein each of the predefined, finite number of classes defines a type of transition between the two images according to a difference in the geographical position of each of the two images and a difference in a viewing angle of the image capturing sensor when acquiring each of the two images.

4. The computer-implemented method according to claim 3, wherein the determining, through data processing on the data processing unit, of at least one transition image comprises determining at least one transition image for each type of transition and the output comprises an indication of the selected at least one transition image for each type of transition.

5. The computer-implemented method according to claim 3, wherein the input for navigation further comprises an indication of a selected type of transition, the determining, through data processing on the data processing unit, of at least one transition image further comprises determining whether the transition classifier information of an edge from the current node corresponds to the selected type of transition, and, in selecting the at least one transition image, only the edges from the current node that correspond to the selected type of transition are considered.

6. The computer-implemented method according to claim 1, wherein the image property information comprises information of brightness of the image and/or color properties of the image.

7. The computer-implemented method according to claim 1, wherein the image information of at least one node among the first set of nodes further comprises metadata information acquired by a sensor different than the image capturing sensor, the metadata information comprising a compass direction of the image capturing sensor when the image associated with the at least one node was acquired, and wherein the similarity information of at least one edge among the first set of edges further comprises a measure of difference in the metadata information.

8. A computer-implemented method for navigating through a set of images depicting a scene, the method comprising:
receiving the set of images from one or more mobile devices, the images captured by the one or more mobile devices;
providing a graph representation of correlations of the images, the graph representation comprising nodes and edges, wherein the images are stored on a data storage unit and shared by multiple applications, wherein each node of a first set of nodes among the nodes represents an image and comprises image information including at least a geographical position of an image capturing sensor when acquiring the image, image content information describing an object depicted in the image, and image property information, and wherein each edge of a first set of edges among the edges represents a transition between two images and comprises similarity information providing a plurality of measures of similarities between the two images, the plurality of measures of similarities being pre-defined and comprising a geographical distance measure, a measure of difference in image content, and a measure of difference in an image property, the providing of the graph representation comprising analyzing the two images in relation to each other to derive the pre-defined plurality of measures of similarities;
receiving input from at least one of the multiple applications for navigation through the set of images, the input comprising an indication of a start geographical position, an indication of a target geographical position, and weight information to control weights to be given to the plurality of measures of similarities of each edge of the first set of edges in the graph representation;
accessing the graph representation, wherein the start geographical position is used to determine a set of possible start nodes in the graph representation, the possible start nodes each having a geographical position within a distance of the start geographical position that is smaller than a set threshold, and wherein the target geographical position is used to determine a set of possible target nodes in the graph representation, the possible target nodes each having a geographical position within a distance of the target geographical position that is smaller than a set threshold; and
determining, through data processing on a data processing unit, a path among a set of possible paths, each of the possible paths leading from a start node within the set of possible start nodes to a target node within the set of possible target nodes, and comprising one or more edges among the first set of edges connecting the start node to the target node, the determining comprising
using the weight information to weigh the plurality of measures of similarities for forming a combined measure of similarity for each of the edges of the possible paths;
determining a sum of the combined measures of similarity for the one or more edges of each of the possible paths; and
selecting the path based on a comparison of the sum of the combined measures of similarity for each of the possible paths.

9. The computer-implemented method according to claim 8, wherein the indication of a start geographical position comprises an indication of a start node, and the indication of a target geographical position comprises an indication of a target node, the start geographical position being indicated by the start node and the target geographical position being indicated by the target node.

10. The computer-implemented method according to claim 8, wherein the image information of at least one node among the first set of nodes further comprises metadata information acquired by a sensor different than the image capturing sensor, the metadata information comprising a compass direction of the image capturing sensor when the image associated with the at least one node was acquired, and wherein the similarity information of at least one edge among the first set of edges further comprises a measure of difference in the metadata information.

11. The computer-implemented method according to claim 10, wherein the metadata information of the at least one node further comprises a sequence identifier defining that the image associated with the at least one node is acquired as part of a temporal sequence of images, and wherein the measure of difference in the metadata information accounts for whether the images associated with the measure of difference are part of a common temporal sequence.

12. A computer-implemented method of adding an image to a set of images depicting a scene, the method comprising:
receiving the set of images from one or more mobile devices, the images captured by the one or more mobile devices;
providing a graph representation of correlations of the images, the graph representation comprising nodes and edges, wherein the images are stored on a data storage unit and shared by multiple applications, wherein each node of at least a first set of nodes among the nodes represents an image and comprises image information including at least a geographical position of an image capturing sensor when acquiring the image, image content information describing an object depicted in the image, and image property information, and wherein each edge of at least a first set of edges among the edges represents a transition between two images and comprises similarity information providing a plurality of measures of similarities between the two images, the plurality of measures of similarities being pre-defined and comprising a geographical distance measure, a measure of difference in image content, and a measure of difference in an image property, the providing of the graph representation comprising analyzing the two images in relation to each other to derive the pre-defined plurality of measures of similarities;

receiving a current image that is to be added to the set of images and information of a geographical position and a viewing angle of an image capturing sensor when acquiring the current image;

extracting, through data processing on a data processing unit, image content information and image property information from the current image;

forming, through data processing on the data processing unit, a current node in the graph representation, the current node representing the current image and including at least the geographical position of an image capturing sensor when acquiring the current image, image content information describing an object depicted in the current image, and image property information of the current image;

determining, through data processing on the data processing unit, a subset of the set of images in the graph representation to which the current image is related, the determining of the subset comprising:

finding a candidate image in the set of images that is related to the current image based on at least a determination that a difference between the current image and the candidate image according to a first pre-defined measure of similarity is smaller than a first set threshold;

determining a second pre-defined measure of similarity between the current image and the candidate image;

selecting the candidate image as part of the subset based on a determination that the difference between the current image and the candidate image according to at least the second pre-defined measure of similarity is smaller than a second set threshold; and for each image in the subset:

determining similarity information between the current image and the image in the subset, wherein the similarity information includes transition classifier information specifying which of a predefined, finite number of classes that the transition between the current image and the image in the subset belongs to, and wherein each of the predefined, finite number of classes defines a type of transition between two images according to a difference in the geographical position of each of the two images and a difference in a viewing angle of the image capturing sensor when acquiring each of the two images; and forming an edge in the graph representation representing the transition between the current image and the image in the subset, the edge comprising the determined similarity information between the current image and the image in the subset.

13. The computer-implemented method according to claim 12, further comprising forming, through data processing on the data processing unit, a combined measure of similarity for an edge in the graph representation, wherein the combined measure of similarity is capable of being controlled on demand by using input of weight information to weigh the plurality of measures of similarities in forming the combined measure of similarity for the edge.

14. The computer-implemented method according to claim 12, further comprising receiving the current image from an application adapted to capture images for the graph representation, the application being arranged in a device comprising an image capturing sensor configured to acquire an image for the graph representation, the application being further arranged to acquire metadata from one or more other sensors in the device to connect the metadata to the acquired image.

* * * * *